United States Patent [19]

Elmer et al.

[11] 3,804,647
[45] Apr. 16, 1974

[54] POROUS GLASS SUPPORTS FOR AUTOMOTIVE EMISSIONS CONTROL CATALYSTS

[75] Inventors: Thomas H. Elmer; Richard E. Tischer, both of Corning, N.Y.

[73] Assignee: Corning Glass Works, Corning, N.Y.

[22] Filed: Dec. 15, 1971

[21] Appl. No.: 208,402

[52] U.S. Cl............... 106/54, 106/52, 156/24, 252/449, 423/213, 106/48
[51] Int. Cl........................ C03c 3/06, C03c 3/30
[58] Field of Search......... 106/40 V, 54, 52, 50, 48; 252/449

[56] References Cited
UNITED STATES PATENTS

| | | | |
|---|---|---|---|
| 3,113,855 | 12/1963 | Elmer | 65/31 |
| 3,489,579 | 1/1970 | Steverding | 106/54 |
| 2,106,744 | 2/1938 | Hood et al. | 106/40 V |
| 3,054,221 | 9/1962 | Elmer | 106/52 |
| 3,485,687 | 12/1969 | Chapman | 106/40 R |

FOREIGN PATENTS OR APPLICATIONS 1,197,067   1/1970   Great Britain................ 106/48

OTHER PUBLICATIONS

Ceramic Industry 1967 Handbook of Materials for Ceramic Processing, pg. 66.

*Primary Examiner*—Helen M. McCarthy
*Attorney, Agent, or Firm*—Clinton S. Janes, Jr.

[57] ABSTRACT

This invention relates to a stabilized porous glass support material for noble metal and base metal catalysts, useful in the catalytic conversion of harmful automotive exhaust emissions. A process for preparing the support material and methods for using it in automotive pollution control systems are also described.

2 Claims, No Drawings

POROUS GLASS SUPPORTS FOR AUTOMOTIVE EMISSIONS CONTROL CATALYSTS

BACKGROUND OF THE INVENTION

It is well known to make a porous glass body by heat treating certain glasses to cause a separation into an acid-soluble phase and an acid-insoluble phase, and then extracting the acid-soluble phase. Such a procedure is set forth by H. P. Hood et al. in U.S. Pat. No. 2,106,744, which describes in detail a method of making a glass composed of over 94 percent silica from an alkali borosilicate glass by thermally treating the glass to separate it into two phases, one of which is rich in boron and alkali, and then extracting this boron-rich phase by leaching in acid. This leaves a highly siliceous structure retaining the shape of the original article but having a multiplicity of interconnecting, submicroscopic pores. If desired, this structure may be consolidated to produce a non-porous, transparent glass by subsequent heat treatment.

Glasses prepared by the method of the aforementioned Hood et al. patent are known in the art by the general designation "96 percent silica glasses," without particular regard for the exact silica content thereof, and this general designation is used herein with that meaning. Thus, it will be understood that the term "porous 96 percent silica glass" as it appears in the following specification and claims is used in the generic sense to include all porous alkali-borosilicate glasses produced in accordance with the above-described method irrespective of the exact silica content of the glass.

Porous bodies obtained by conventional leaching with acid typically have an average pore diameter of about 40 to 50A. For certain applications it is desirable to have larger controlled pore diameters, for example, ranging up to about 250A or even higher. Methods are also known for enlarging the pores of porous 96 percent silica glasses in a controlled manner, as shown by the patent to Chapman et al., U.S. Pat. No. 3,485,687, describing one such method. Using such techniques, one can obtain porous 96 percent silica glasses with controlled pore diameters ranging anywhere from 40A to about 250A or higher, if desired.

We have discovered that porous 96 percent silica glasses are suitable support materials for base and noble metal catalytic coatings from the standpoint of surface area and porosity, since surface areas up to about 200 square meters per gram and closely controlled pore sizes are readily obtainable. These parameters are important to the catalytic activity of noble metals such as platinum, iridium, rhodium, ruthenium, and palladium, and base metals such as copper-chrome, which would be suitable for use with the porous glass support materials of the present invention.

We have also discovered that porous glass can act as a scavenger for trace metallic ion impurities in exhaust fumes, thus preventing poisoning of the base or noble metal catalyst by these impurities. The mechanism for this scavenging action is not completely understood, but is perhaps attributable to the diffusion of impurities into and reaction within the pores of the glass.

Unfortunately, early attempts to use porous glasses as substrate materials for copper-chrome or platinum catalysts have been only partially successful because of the marginal thermal stability of the glass as a support material. Thus, the catalytic activity of porous glass-supported catalysts in many cases deteriorates very markedly on prolonged heating at elevated temperatures. We have now discovered that this behavior is chiefly caused by the migration of some of the boron in such glasses to the surface of the material on heating, and the subsequent blocking of active sites on the catalyst by the liberated boron to cause catalytic poisoning. The observed deterioration is also attributed in part to the low dimensional stability of the material at the use temperatures encountered in automotive catalytic conversion units, which can result in microcracking and spalling of the surface of the material and, thus, loss of the supported catalyst. High temperature softening of 96 percent silica glasses has been recognized as a limitation on their use, and a method of increasing the annealing point of these glasses by a process of heat treatment and re-leaching is described in the patent to Elmer, U.S. Pat. No. 3,113,855. However, that process relates to the manufacture of non-porous or consolidated glasses for use as lamp envelopes or the like, and the problems inherent in the use of porous 96 percent silica glasses as high temperature catalyst support materials are not disclosed.

It is, therefore, the object of the present invention to provide a porous glass support material which will demonstrate the required surface area, porosity, and thermal stability for catalytic automotive exhaust emissions control systems.

It is a further object of the invention to provide novel methods for employing a stabilized porous glass support material in catalytic automotive pollution control systems as a support for both noble metal and base metal catalysts, and thus to provide improved devices for controlling automotive exhaust emissions.

Other objects and advantages of the present invention will become apparent from the following summary and detailed description thereof.

SUMMARY OF THE INVENTION

Briefly, we have discovered a process for stabilizing porous 96 percent silica glasses for use as a catalytic support material. The process comprises the steps of heating the glass to at least about the maximum projected use temperature thereof as a catalytic support material, for a time sufficient to cause boron migration to the surface of the glass, and then washing the glass to remove the boron present on the surface of the material. Analysis indicates that the boron exuded upon heating is present on the glass surface as an oxide or hydrate; accordingly, removal is accomplished with water or aqueous solutions.

Following the extraction of the surface boron, the material may be dried to produce a catalyst support material which is stable at temperatures up to about the temperature of the heat treatment. Boron migration and dimensional instability will not normally be observed unless the material is maintained at temperatures in excess of the projected use temperature for an extended period of time. Brief excursions above the projected use temperatures do not have a significant detrimental effect on the material. Because of the flexibility inherent in the physical configuration of porous glass, stabilized support materials having a broad range of desirable porosity and surface area characteristics may be prepared.

Stabilized porous glass support materials prepared according to the invention may be employed in a variety of ways to produce useful automotive pollution control devices. One suitable method of use comprises grinding the stabilized porous glass into a powder, incorporating the ground glass into a slurry, applying the slurry to a suitable monolithic refractory metal oxide support structure, drying the coated structure, and firing to obtain a stable, bonded, porous glass coating thereon. Alternatively, the porous glass may be employed, in the form of beads, tubes, or other shapes, as a support material in reactors of the type employed in the prior art to contain activated alumina beads as the catalyst. As a further alternative, phase-separable, alkali borosilicate glasses of the kind employed as starting materials in U.S. Pat. No. 2,106,744 may be applied to a ceramic support structure as a glaze, then phase-separated and leached as described in the aforementioned patent, and finally heat treated at temperatures at least equal to the projected use temperature of the material and washed to remove surface boron.

Following the preparation of a coated support structure or stabilized support material as herein described, base or noble metal catalysts may be applied thereto according to the various methods known in the prior art to provide a catalytically active structure or material demonstrating excellent stability and catalytic activity over a broad range of temperatures and operating conditions.

DETAILED DESCRIPTION OF THE INVENTION

The initial step of the process of manufacturing a stabilized porous glass support material as herein described involves heating porous 96 percent silica glass to at least about the maximum projected use temperature of the glass as a catalytic support material. The effect of this heating is to cause the migration of boron to the surface of the glass and, simultaneously, a dimensional partial consolidation of the material. While beneficial results may be obtained through rather short treatments, e.g., about 4 hours, it has been found that longer treatments at temperatures in excess of the maximum expected use temperature of the material are more effective to insure stability in actual use. At the same time, it is recognized that excessive temperatures cause the loss of pores and, ultimately, complete consolidation of the material.

Estimates of the projected maximum use temperatures of catalytic conversion units in service on automotives vary widely; however, chemical and dimensional stability of the material supporting the catalyst to temperatures of at least about 800°C. and possibly as high as 870°C. (1,600°F.) or above may be required. Accordingly, we employ a heat treatment step wherein the porous glass is heated to a temperature in the range from about 900°-950°C. for a time in the range from about 4-16 hours. The migration of boron is rapid in the early stages of treatment but is essentially completed within the described period, so that while longer heat treatments of up to several days may be employed, such treatments are not deemed particularly useful for the purposes of the present invention. The use of heat treatments below about 900°C. is not recommended since, ordinarily, the required degree of thermal and chemical stability will not be obtained. Heating at temperatures above about 950°C. is undesirable because the substantial loss of pores, and, thus, surface area, may occur.

Analysis has indicated that the boron which is exuded from the glass during the above-described heat treatment is present on the surface of the glass after cooling as an oxide or hydrate. Accordingly, after the glass has been heat treated and then cooled, the boron may readily be extracted from the porous structure by washing the glass with water or an aqueous solution. Because the boron migration from the glass is normally accompanied by some alkali migration, resulting in the presence of some alkali in the exuded material which would be detrimental to the catalytic activity of most catalysts subsequently to be applied, we prefer to carry out the washing step with weakly acidic aqueous solutions. Examples of suitable washing solutions include dilute acids such as 0.1 Normal $HNO_3$, $HCl$, $H_2SO_4$, or acetic acid. The solubility of the thermally liberated boron in the washing solution is enhanced by carrying out the washing step at elevated temperatures so that, preferably, hot solutions (e.g., 95°C.) will be employed. Strong acids (above about 1.0 Normal) are not recommended because of the added difficulty of contamination presented thereby; minimization of anionic impurities in the support is quite important in catalytic applications.

Following washing, the stabilized porous glass may be dried to remove the excess water if, for example, it is to be employed in bead or pellet form in a reactor or stored for appreciable periods of time. Alternatively, it may be incorporated directly into an aqueous slurry for application as a coating to a ceramic support structure, being first ground into a powder suitable for that purpose if this has not already been done prior to stabilization.

As previously explained, the above-described procedure is useful in the stabilization of any of the porous 96 percent silica glasses described in the aforementioned patents to Hood et al., U.S. Pat. No. 2,106,744 and Chapman et al., U.S. Pat. No. 3,485,687. The stabilization procedure does not significantly affect the pore diameter distribution of the material, and while some reduction in surface area is observed, the stabilized product retains a surface area more than sufficient for use as a support material for presently available base and noble metal catalysts. And, while the treatment is not effective to remove all of the boron and alkali from porous 96 percent silica glasses, it is effective to lower the boron and alkali content of the glass to the point where migration will not occur at the temperatures encountered in service in catalytic automotive pollution control devices. The stabilized porous material normally has a composition consisting essentially, in weight percent on the oxide basis, of at least about 94 percent $SiO_2$, not more than about 2.5 percent $B_2O_3$, not more than about 0.03 percent of alkali metal oxides such as $K_2O$, $Na_2O$, and $Li_2O$, and, preferably, at least 0.1 percent $Al_2O_3$. The presence of alumina is important because it helps to immobilize traces of alkali remaining in the glass and improves the thermal stability of the support material. The average pore diameter of the glass will normally range from 40A to about 250A and the surface area of the material will range from about 10 to about 50 square meters per gram.

One method of using the porous glass support material of the present invention which is particularly preferred comprises forming the material into a powder having a particle size range suitable for use in an aqueous slurry coating system, preparing an aqueous slurry comprising the powdered material, coating a suitable ceramic support structure with the slurry, drying the coated support structure, and firing the coated structure to form an adherent coating comprising the stabilized porous glass support material. Noble or base metal catalysts may then be applied to the coated support according to conventional methods.

The powdering of the porous glass support material may be accomplished by any convenient procedure. For example, we have found that ball-milling porous glass fragments will produce a powdered porous glass batch having a maximum particle size of about 100 mesh (United States Standard Sieve) and an average particle size of about 325 mesh in about three hours, which is suitable for use in the preparation of an aqueous slurry according to our preferred method.

In preparing a suitable aqueous slurry for providing ceramic support structures with a porous glass coating, sufficient glass powder should be employed to yield a stable, flowable composition. We have also found that the use of colloidal alumina (Boehmite) in the slurry is useful, both as a stabilization aid in retarding the settling rate of the porous glass in the slurry and as a binder to improve the integrity and adherence of the fired porous glass coating. Suitable alumina additions may comprise from about 5–30 percent by weight of the solids component of the slurry, calculated as $Al_2O_3$. Of course, other binders which are stable at the projected use temperature of the catalyst may alternatively be employed.

The slurry prepared as described may be applied to a suitable ceramic support structure by any suitable means, such as dipping, pouring, or spraying. Suitable ceramic support structures include structures of the honeycomb type described, for example, in U.S. Pat. No. 3,112,184 to Hollenbach. These structures are currently under consideration for use as monolithic catalytic supports in automotive emissions control systems, having a high surface area-to-weight ratio and comprising a plurality of parallel longitudinal thin-walled passages, continuous from one end of the structure to the other, through which the automotive exhaust gases to be treated may flow. They are generally of spodumene, cordierite, or petalite composition. Alternatively, ceramic supports comprised of glass-ceramics, i.e., glasses which have been crystallized *in situ* through the introduction of nucleating agents and appropriate thermal treatments, may be employed.

Following the application of the aqueous slurry to the ceramic support structure, the structure should be dried to remove the water of suspension and, finally, fired to form an adherent porous glass support coating. When colloidal alumina is employed in the aqueous slurry, firing serves the further purpose of removing the water of hydration from the alumina (Boehmite) causing conversion to the stable anhydrous gamma alumina form. Drying may be accomplished by heating at moderately elevated temperatures, e.g., 150°C., for at least about 15 minutes, and firing may be suitably carried out at temperatures in the range from about 450°–900°C. for at least about one-half hour.

Refractory metal oxide support structures treated according to the above-described procedure may be characterized as having a coating comprising a stabilized porous 96 percent silica glass support material consisting essentially, in weight percent on the oxide basis, of at least about 94 percent silica, not more than about 2.5 percent $B_2O_3$, not more than about 0.03 percent total of alkali metal oxides, and, preferably, at least 0.1 percent $Al_2O_3$, said material having an average pore diameter ranging from about 40–250A and a surface area of at least about 10 square meters per gram. The coating preferably further comprises about 5–30 percent by weight of $Al_2O_3$, in the form of gamma alumina, as a binder.

Base and noble metal catalysts may be applied to the above-described structures according to any of the well-known prior art methods, and, following the application of the desired base metal or noble metal catalyst, the coated structure is suitable for use in a process for treating automotive exhaust gases to oxidize the harmful carbon monoxide and hydrocarbon constituents therein. The process generally comprises contacting automotive exhaust gases with the structure by passing the exhaust gases therethrough. At temperatures above about 250°F. in the presence of oxygen, the described stabilized porous 96 percent silica glass support material in combination with the base or noble metal catalyst effectively converts part or most of the aforesaid harmful constituents to carbon dioxide and water. The support material would, of course, also be useful in combination with suitable catalysts to promote the reduction of nitrogen oxides or the catalytic reaction of other harmful constituents in automotive exhaust gases.

The invention may be further understood by reference to the following detailed examples setting forth preferred embodiments of the methods and materials herein disclosed.

EXAMPLE I

A quantity of five-eighths inch diameter glass tubing made up of a phase-separable alkali borosilicate glass consisting in weight percent, on the oxide basis as calculated from the batch, of about 61.6 percent $SiO_2$, 8.04 percent $Na_2O$, 28.2 percent $B_2O_3$, 1.9 percent $Al_2O_3$, and 0.3 percent $As_2O_3$ is heat treated at 580°C. for 3 hours to phase separate the glass. The tubing is then placed in an acid leaching bath composed of 1.0 Normal nitric acid for a period of about 24 hours, removed, washed with 0.1 Normal $HNO_3$ to extract the leaching liquor and dried to remove residual water. The described treatment is effective to convert the glass tubing to a porous glass material having an average pore diameter of about 40–50A and a surface area of about 250 square meters per gram.

The tubing thus prepared is heated to a temperature of 900°C. for 16 hours and cooled to room temperature. Analysis indicates the presence of significant surface concentrations of boron. The tubing is washed with hot (about 95°C.) 0.1 Normal $HNO_3$ to remove the boron surface deposits, and then crushed to produce a ground porous glass batch having an average particle size of about 100 mesh. This porous glass has a surface area of about 50 square meters per gram and an average pore diameter of about 50A.

The porous glass batch thus prepared is mixed with water to a suitable consistency for ball milling, placed in a ball mill and milled for about 3 hours, and finally removed and dried by heating at 150°C. for 16 hours. The milled dry batch has a particle size distribution such that all of the material passes 100 mesh and more than 50 percent of the material passes 400 mesh. Using this powdered glass batch, a slurry is prepared by adding 765 grams of dry glass and 115 grams of DuPont Baymal colloidal alumina to 2310 milliliters of distilled water and mixing until a smooth, stable slurry is obtained.

A cylindrical monolithic ceramic support structure of spodumene composition and honeycomb type, about 1 inch in diameter and 2 5/16 inches in length, and having about 900 longitudinal passages per square inch of cross sectional area with passage walls averaging about 10 mils in thickness, is coated with the slurry by dipping. The slurry flows readily into the passages to completely coat the support structure. After a complete coating is obtained, the structure is removed from the slurry, shaken, and blown out with compressed air to remove excess coating material which might obstruct the passages. The coated structure is then dried at 150°C. in a hot air oven to remove the mechanically held water and, thus, to immobilize the coating.

Following drying, the coated monolithic structure is fired by heating to a temperature of about 450°C. and holding at that temperature for one-half hour. After cooling, examination discloses a uniform, tightly-bonded coating of porous glass and alumina on the support structure which comprises about 9.6 percent of the total weight of the coated support structure.

A coating of a platinum catalyst is provided on the coated support structure by dipping into an aqueous solution of chloro-platinic acid with a platinum metal content of about 2 percent by weight to saturate the structure, shaking, drying the structure at 150°C. for about an hour, and firing by heating at a rate of about 300°C. per hour to 500°C. and soaking at 500°C. for 1 hour. The platinum loading obtained by this technique is approximately 27 milligrams per cubic inch of support structure.

The catalytic activity of the platinum-bearing structure is evaluated by determining the temperature at which the structure effects a 50 percent conversion of CO and hydrocarbons (HC) in a moving gas stream passing through the structure to $CO_2$ and $H_2O$. It is found that the structure converts 50 percent of the available HC at 450°F. and 50 percent of the available CO at 440°C.

Conversion results for similarly prepared monolithic structures of varying composition and porous glass support loading are shown in Table I below. All structures had a platinum loading of about 27 milligrams per cubic inch of support.

TABLE I

| | Structure Composition | Support Material Loading (wt. %) | 50% Conversion Temperature HC | CO |
|---|---|---|---|---|
| 2. | spodumene | 6.0% | 465°F. | 450°F. |
| 3. | spodumene | 9.0% | 470°F. | 455°F. |
| 4. | cordierite | 6.4% | 455°F. | 450°F. |
| 5. | cordierite | 8.3% | 470°F. | 440°F. |
| 6. | cordierite | 13.2% | 475°F. | 460°F. |
| 7. | spodumene (glass-ceramic) | 9.5% | 490°F. | 470°F. |

EXAMPLE II

Two porous-glass-coated, platinum-bearing monolithic support structures are prepared according to the procedures of Example I, except that, whereas Structure A is prepared using the boron-stabilized porous glass described in Example I, Structure B is prepared using unstabilized porous 96 percent silica glass. This porous glass has been phase-separated, leached, and ground, but not subjected to a heat treatment at projected use temperatures to exude and remove boron and to stabilize the material. Both structures are of spodumene composition, have a porous glass-alumina support coat loading of about 8.2 percent of the total weight of the coated structure, and a platinum loading of about 27 milligrams per cubic inch of support. The structures are tested for catalytic activity before and after a thermal aging treatment comprising firing them at 800°C. for 24 hours in air. This treatment is designed to evaluate the effects of thermal aging on stabilized and unstabilized support materials. The results are shown in Table II below.

TABLE II

| | Structure A | | Structure B | |
|---|---|---|---|---|
| | New | Aged | New | Aged |
| 50% HC Conversion Temperature | 440°F. | 460°F. | 445°F. | 640°F. |
| 50% CO Conversion Temperature | 420°F. | 460°F. | 445°F. | 640°F. |

From this example it is apparent that the porous glass support material of the invention demonstrates significantly better thermal stability than unstabilized porous 96 percent silica glass when employed as a catalytic support material.

EXAMPLE III

Following the procedure described in Example I, a cylindrical ceramic support structure having an alumina-porous glass support coating is prepared. This coated support structure is provided with a copper chromite ($CuCr_2O_4$) base metal catalyst according to a well-known procedure wherein the support is saturated with $Cu(NO_3)_2$ and $Cr(NO_3)_3$ solutions, dried, and fired to produce a copper chromite coating. The copper-chromite coating comprises about 12 percent by weight of the coated structure.

The catalytic activity of the copper chromite-bearing structure is evaluated as hereinbefore described, and it is determined that the structure effects a 50 percent conversion of the available CO at 440°F. and a 50 percent conversion of the available hydrocarbon at 670°F.

From the above results we have concluded that stabilized porous 96 percent silica glass is an excellent support material for use in combination with both noble metal and base metal catalysts in the treatment of automotive exhaust gases to remove harmful constituents therein.

We claim:

1. A stabilized catalyst support material suitable for use at temperatures up to about 870°C. in combination with base and noble metal catalysts to treat automotive exhaust gases which consists of a powdered 96 percent silica glass having a maximum particle size of about 100 mesh United States Standard Sieve, an average pore diameter in the range from about 40–250A, a surface area of at least about 10 square meters per gram, and a composition consisting essentially, in weight percent on the oxide basis, of at least about 94 percent $SiO_2$, at least about 0.1 percent $Al_2O_3$, not more than about 2.5 percent $B_2O_3$, and not more than about 0.03 percent total of alkali metal oxides.

2. A stabilized catalyst support material according to claim 1 which additionally contains an alumina binder addition comprising about 5–30 percent by weight of said material.

* * * * *